(12) United States Patent
Yanagida et al.

(10) Patent No.: US 7,556,881 B2
(45) Date of Patent: Jul. 7, 2009

(54) LITHIUM SECONDARY BATTERY

(75) Inventors: Toshio Yanagida, Tokushima (JP); Hiroshi Minami, Kobe (JP); Taizou Sunano, Tokushima (JP); Maruo Kamino, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 220 days.

(21) Appl. No.: 11/316,983

(22) Filed: Dec. 27, 2005

(65) Prior Publication Data

US 2006/0141359 A1 Jun. 29, 2006

(30) Foreign Application Priority Data

Dec. 28, 2004 (JP) ............... 2004-380102

(51) Int. Cl.
*H01M 6/10* (2006.01)
*H01M 4/00* (2006.01)

(52) U.S. Cl. ............ 429/94; 429/218.1; 429/245; 429/233; 429/247; 429/231.95; 429/163

(58) Field of Classification Search ........... 429/218.1, 429/245, 233, 247, 231.95, 163, 94
See application file for complete search history.

(56) References Cited

U.S. PATENT DOCUMENTS 4,397,924 A * 8/1983 Rea et al. ............... 429/323

| | | | | |
|---|---|---|---|---|
| 2005/0084759 A1* | 4/2005 | Miyachi et al. | ........ | 429/231.95 |
| 2005/0106464 A1* | 5/2005 | Yoshida et al. | ........... | 429/233 |
| 2006/0110660 A1* | 5/2006 | Satou et al. | ........... | 429/231.95 |
| 2006/0121335 A1 | 6/2006 | Seyama | ........... | 429/50 |

FOREIGN PATENT DOCUMENTS

| | | |
|---|---|---|
| JP | 2005-150038 A | 6/2005 |
| WO | 01/29912 A1 | 4/2001 |
| WO | 01/29913 A1 | 4/2001 |
| WO | 02/071512 A1 | 9/2002 |
| WO | WO 03/058145 * | 7/2003 |
| WO | 2004/042861 A1 | 5/2004 |

* cited by examiner

*Primary Examiner*—Laura S Weiner
(74) *Attorney, Agent, or Firm*—Kubovcik & Kubovcik

(57) ABSTRACT

Charge-discharge cycle performance is improved in a lithium secondary battery that adopts a thin film made of silicon or a silicon alloy as its negative electrode active material and has a wound electrode structure. The lithium secondary battery includes: a negative electrode having a current collector and a thin film made of silicon or a silicon alloy as a negative electrode active material, the thin film provided on the current collector; a positive electrode; a separator; the positive and negative electrodes being overlapped with the separator interposed therebetween, and the positive and negative electrodes and the separator being wound around to form an electrode assembly; a non-aqueous electrolyte; and a battery case accommodating the electrode assembly. The ratio of theoretical capacity per unit area of the negative electrode to charge capacity per unit area of the positive electrode is within the range of from 1.9 to 4.4.

5 Claims, 4 Drawing Sheets

US 7,556,881 B2

LITHIUM SECONDARY BATTERY

BACKGROUND OF THE INVENTION

1. Field of the Invention

The present invention relates to lithium secondary batteries.

2. Description of Related Art

In recent years, lithium secondary batteries using a non-aqueous electrolyte and performing charge-discharge operations by transferring lithium ions between positive and negative electrodes have been utilized as a new type of high power, high energy density secondary battery.

As for electrodes for such lithium secondary batteries, some research has been conducted on electrodes that use a material capable of alloying with lithium as its negative electrode active material. One example of the material capable of alloying with lithium that has been studied is silicon. However, a problem with the material such as silicon capable of alloying with lithium has been that the volume of the active material expands and shrinks when it intercalates and deintercalates lithium, causing the active material to pulverize or peel off from the current collector as the charge-discharge process is repeated. As a consequence, the current collection performance in the electrode lowers, degrading the battery's charge-discharge cycle performance.

Electrodes for lithium secondary batteries that employ silicon as the active material and exhibit good charge-discharge cycle performance have been proposed in the following published PCT applications, which are assigned to the assignee of the present invention. Published PCT application No. WO 01/029913 proposes an electrode in which a non-crystalline silicon thin film is formed on a current collector by a thin-film forming technique, such as sputtering, chemical vapor deposition (CVD), or evaporation. Published PCT application No. WO 02/071512 proposes an electrode for lithium secondary batteries in which an element such as cobalt is added to silicon.

By using the electrodes proposed in the just-mentioned publications, good charge-discharge cycle performance can be attained even when a material that alloys with lithium is used as the negative electrode active material.

Nevertheless, the lithium secondary battery having a structure in which electrodes are wound around and accommodated in a battery case has a problem of poorer charge-discharge cycle performance than that employing a flat-shaped electrode.

BRIEF SUMMARY OF THE INVENTION

It is an object of the present invention to provide a lithium secondary battery exhibiting improved charge-discharge cycle performance, the lithium secondary battery adopting a thin film made of silicon or a silicon alloy as its negative electrode active material and having a wound electrode structure.

The present invention provides a lithium secondary battery comprising: a negative electrode having a current collector and a thin film made of silicon or a silicon alloy as a negative electrode active material, the thin film provided on the current collector; a positive electrode; a separator; the positive and negative electrodes being overlapped with the separator interposed therebetween, and the positive and negative electrodes and the separator being wound around to form an electrode assembly; a non-aqueous electrolyte; and a battery case accommodating the electrode assembly; wherein the ratio of theoretical capacity per unit area of the negative electrode to charge capacity per unit area of the positive electrode (negative electrode capacity/positive electrode capacity) is within the range of from 1.9 to 4.4.

The present invention enables a lithium secondary battery employing a thin film made of silicon or a silicon alloy as the negative electrode active material and having a wound-electrode structure to have high charge-discharge capacity and good charge-discharge cycle performance.

DETAILED DESCRIPTION OF THE INVENTION

Figure 1:
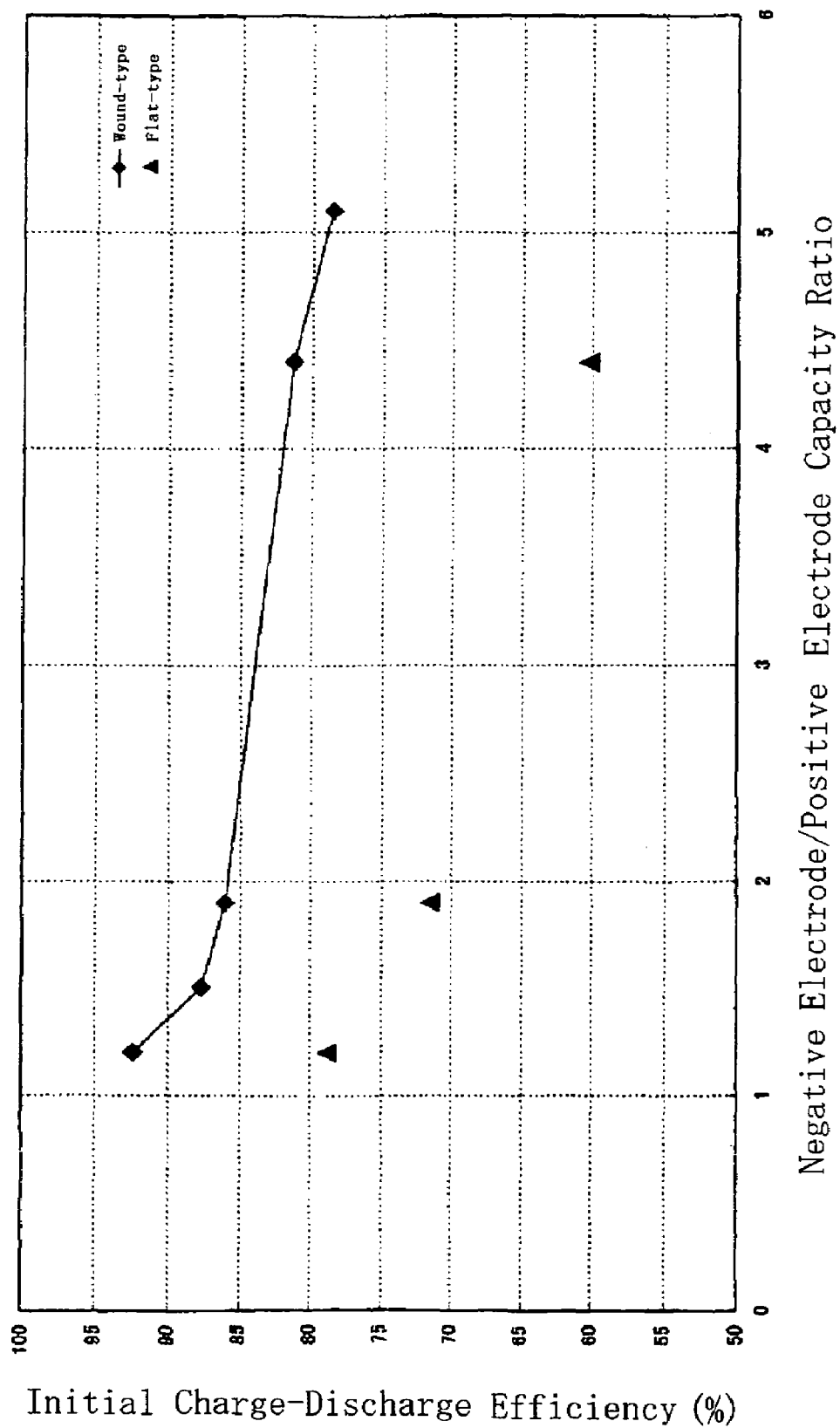
FIG. 1 is a graph illustrating a relationship between negative electrode/positive electrode capacity ratio (negative electrode capacity/positive electrode capacity) and initial charge-discharge efficiency.

A lithium secondary battery according to the present invention comprises a negative electrode, a positive electrode, a separator, a non-aqueous electrolyte, and a battery case. The negative electrode has a current collector and a thin film made of silicon or a silicon alloy as a negative electrode active material, the thin film being provided on the current collector. The positive and negative electrodes are overlapped with the separator interposed therebetween, and the electrodes and the separator are wound around to form an electrode assembly, which is accommodated in the battery case. The ratio of theoretical capacity per unit area of the negative electrode to charge capacity per unit area of the positive electrode (negative electrode capacity/positive electrode capacity) is within the range of 1.9 to 4.4.

Setting the ratio of the theoretical capacity per unit area of the negative electrode with respect to the charge capacity per unit area of the positive electrode (negative electrode capacity/positive electrode capacity) to be within the range of from 1.9 to 4.4 according to the present invention enables a lithium secondary battery to have high charge-discharge capacity and good charge-discharge cycle performance.

If the just-mentioned ratio of negative electrode capacity/positive electrode capacity is less than 1.9, the battery's charge-discharge cycle performance degrades. On the other hand, if the ratio of negative electrode capacity/positive electrode capacity exceeds 4.4, the initial charge-discharge efficiency is lowered and high charge-discharge capacity cannot be attained.

In the present invention, charge capacity per unit area of the positive electrode is a battery's initial charge capacity. In other words, it is a capacity corresponding to the amount of lithium per unit area that is deintercalated from the positive electrode during the initial charge cycle.

In the present invention, theoretical capacity per unit area of a negative electrode is a capacity per unit area that is obtained by charging the electrode to 0 V versus lithium in an electrolyte solution, using metallic lithium as the counter electrode. The theoretical capacity can be obtained by preparing a three-electrode cell that uses a negative electrode to be used for a lithium secondary battery and adopts metallic lithium as the counter electrode and the reference electrode, and charging the cell under the just-mentioned condition. It is preferable that the electrolyte solution used for the cell be the electrolyte solution used for the lithium secondary battery to be fabricated.

According to the present invention, it is possible to attain good charge-discharge cycle performance even with an electrode assembly in which a positive electrode and a negative electrode are overlapped and wound around. It should be noted that the wound electrode structure in the present invention may be any structure as long as the electrode is wound around at least one time such that an overlapped portion forms by the winding.

The negative electrode in the present invention is comprised of an electrode in which a thin film made of silicon or a silicon alloy is provided, as the negative electrode active material, on a current collector. Examples of the silicon alloy include a silicon-cobalt alloy, a silicon-iron alloy, a silicon-zinc alloy, and a silicon-zirconium alloy. A silicon-cobalt alloy is especially preferable. It is preferable that the content of silicon in the silicon alloy be 50 weight % or greater.

The active material in the present invention expands in volume when intercalating lithium, and shrinks in volume when deintercalating the lithium that has been intercalated. Because of such expansion and shrinkage in the volume of the active material, gaps are formed in the active material thin film. In particular, the gaps are easily formed when irregularities exist in a surface of the active material thin film. Accordingly, when the active material thin film is formed by depositing it on a current collector having large irregularities on the surface, it is possible to form irregularities, corresponding to the irregularities on the surface of the current collector, which is a base layer, also on the surface of the active material thin film. In the regions that join the valleys of the irregularities in the thin film and the valleys of the irregularities in the surface of the current collector, low-density regions tend to form. It is preferable that the gaps be formed along such low-density regions, and that the thin film is divided into columnar structures by the gaps.

In the present invention, it is preferable that irregularities be formed in the current collector surface as described above. Therefore, it is preferable that the current collector surface be roughened. The current collector surface preferably has an arithmetical mean roughness Ra of 0.1 μm or greater, and more preferably in the range of 0.1 μm to 1 μm. Arithmetical mean roughness Ra is defined in Japanese Industrial Standard (JIS) B 0601-1994. Arithmetical mean roughness Ra can be measured by, for example, a surface roughness meter.

Examples of the method for roughening a current collector surface include plating, vapor deposition, etching, and polishing. The plating is a technique for roughening a current collector surface by forming, on a current collector made of a metal foil, a thin film layer that has irregularities on its surface. Examples of the plating include electroplating and electroless plating. Examples of the etching include techniques by physical etching and chemical etching. Examples of the polishing include polishing with sandpaper and polishing by blasting.

In the present invention, it is preferable that the current collector be formed of a conductive metal foil. Illustrative examples of the conductive metal foil include those made of a metal such as copper, nickel, iron, titanium, and cobalt, and those made of an alloy comprised of combinations thereof. Those containing a metal element that easily diffuses into the materials for the active material are especially preferable. Examples of such a metal foil include a metal foil containing copper, especially a copper foil or a copper alloy foil. It is preferable that a heat-resistant copper alloy foil be used as the copper alloy foil. The heat-resistant copper alloy refers to a copper alloy that has a tensile strength of 300 MPa or greater after annealing at 200° C. for 1 hour. Usable examples of the heat-resistant copper alloy include the alloys listed in Table 1 below. It is preferable to use a current collector in which a copper layer or a copper alloy layer is provided on such a heat-resistant copper alloy foil by an electrolytic process in order to increase arithmetical mean roughness Ra.

TABLE 1

(Percentage: wt. %)

| Alloy | Composition |
| --- | --- |
| tin-containing copper | 0.05-0.2% tin and 0.04% or less phosphorus are added to copper |
| silver-containing copper | 0.08-0.25% silver is added to copper |
| zirconium copper | 0.02-0.2% zirconium is added to copper |
| chromium copper | 0.4-1.2% chromium is added to copper |
| titanium copper | 1.0-4.0% titanium is added to copper |
| beryllium copper | 0.4-2.2% beryllium and trace amounts of cobalt, nickel, and iron are added to copper |
| iron-containing copper | 0.1-2.6% iron and 0.01-0.3% phosphorus are added to copper |
| high strength brass | 2.0% or less aluminum, 3.0% or less manganese, and 1.5% or less iron are added to brass containing 55.0-60.5% copper |
| tin-containing brass | 80.0-95.0% copper, 1.5-3.5% tin, and the rest being zinc |
| phosphor bronze | Copper being the main component, containing 3.5-9.0% tin, and 0.03-0.35% phosphorus |
| aluminum bronze | 77.0-92.5% copper, 6.0-12.0% aluminum, 1.5-6.0% iron, 7.0% or less nickel, and 2.0% or less manganese |
| cupro-nickel | Copper being the main component, containing 9.0-33.0% nickel, 0.40-2.3% iron, 0.20-2.5% manganese, and 1.0% or less zinc |
| Corson alloy | Copper containing 3% nickel, 0.65% silicon, and 0.15% magnesium |
| Cr—Zr copper alloy | Copper containing 0.2% chromium, 0.1% zirconium, and 0.2% zinc |

In the present invention, it is preferable that the active material thin film is amorphous or microcrystalline. In the present invention, the active material thin film may be formed, using the foregoing current collector, by depositing it on the collector by CVD, sputtering, evaporation, plating, or the like.

In the present invention, the thickness of the thin film is not particularly limited but is preferred to be within the range of from 1 μm to 20 μm.

Examples of the solute of the non-aqueous electrolyte in the present invention include, but are not particularly limited to, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof.

In the present invention, the solvent for the non-aqueous electrolyte is not particularly limited, and any solvent may be used as long as it can be used as the solvent for a lithium secondary battery. Preferable examples of the solvent include cyclic carbonate and chain carbonate. Examples of the cyclic carbonate include ethylene carbonate, propylene carbonate, butylene carbonate, and vinylene carbonate. Among them, ethylene carbonate is especially preferable. Examples of the chain carbonate include dimethyl carbonate, methyl ethyl carbonate, and diethyl carbonate. Moreover, a mixed solvent in which two or more solvents are mixed is preferable as the solvent. In particular, it is preferable to use a mixed solvent containing a cyclic carbonate and a chain carbonate. In addition, a mixed solvent of one of the above-mentioned cyclic carbonates and an ether-based solvent such as 1,2-dimethoxyethane or 1,2-diethoxyethane is also preferable.

In the present invention, the electrolyte may be a gelled polymer electrolyte in which an electrolyte solution is impregnated in a polymer electrolyte such as polyethylene oxide or polyacrylonitrile, or may be an inorganic solid electrolyte such as LiI and $Li_3N$.

In the present invention, it is preferable that carbon dioxide be dissolved in the non-aqueous electrolyte. Dissolving carbon dioxide in the non-aqueous electrolyte can prevent the thin film from becoming porous. The thin film made of silicon or a silicon alloy tends to become porous and increase in thickness as it undergoes repeated charge-discharge cycles of intercalating and deintercalating lithium. The thin film can be prevented from becoming porous in this way when carbon dioxide is dissolved in the non-aqueous electrolyte. Consequently, the increase in the thickness of the thin film is lessened, and the volume energy density can be increased. The amount of carbon dioxide to be dissolved in the non-aqueous electrolyte is preferably 0.01 weight % or greater, and more preferably 0.1 weight % or greater. Generally, it is preferable that carbon dioxide be dissolved in the non-aqueous electrolyte until it saturates the electrolyte.

Examples of the positive electrode active material in the present invention include lithium-containing transition metal oxides, such as $LiCoO_2$, $LiNiO_2$, $LiMn_2O_4$, $LiMnO_2$, $LiCo_{0.5}Ni_{0.5}O_2$, and $LiNi_{0.7}Co_{0.2}Mn_{0.1}O_2$, and metal oxides that do not contain lithium, such as $MnO_2$. In addition, various substances may be used without limitation as long as such substances are capable of electrochemically intercalating and deintercalating lithium.

Hereinbelow, the present invention is described in further detail based on examples thereof. It should be construed, however, that the present invention is not limited to the following examples, and various changes and modifications are possible without departing from the scope of the invention.

Example 1

Preparation of Negative Electrode

A pressure-rolled copper foil using Corson alloy on both sides of which irregularities were formed by an electrolytic process (tensile strength 400 N/mm², thickness 18 μm, Ra=0.4 μm, Rz=5 μm) was used as a current collector. Silicon-cobalt alloy thin films (cobalt content: 30 weight %) were formed on the surfaces of the copper foil by RF sputtering. The conditions of the sputtering were: sputtering gas (Ar) flow rate: 100 sccm, substrate temperature: room temperature (not heated), reaction pressure: $1.0 \times 10^{-3}$ Torr, and high-frequency power: 200 W. The thin films were deposited to a thickness of about 6 μm, and were formed on both sides of the copper foil. An XRD analysis confirmed that the resultant thin films were amorphous.

Preparation of Positive Electrode 94 weight % of $LiCoO_2$ powder having an average particle size of 10 μm, 3 weight % of carbon powder as a conductive agent, and 3 weight % of polyvinylidene fluoride powder as a binder agent were mixed together. N-methylpyrrolidone was added to the resultant mixture, and the mixture was kneaded to prepare a slurry. The resultant slurry was applied onto both sides of a current collector made of a 15 μm-thick aluminum foil by doctor blading. The weight of the mixture applied after drying was set at 58 mg/10 cm² per each side. The electrode on which the mixture was applied was thereafter pressure-rolled.

Preparation of Electrolyte Solution

LiPF6 was dissolved at a concentration of 1 mole/liter into a mixed solvent of a 3:7 volume ratio of ethylene carbonate and diethyl carbonate. Carbon dioxide gas was dissolved into the solution until it saturates the solution, to prepare an electrolyte solution. The amount of carbon dioxide dissolved was 0.37 weight Preparation of Lithium Secondary Battery The negative electrode was cut out into dimensions of 380 mm×52 mm, and the positive electrode was cut out into dimensions of 402 mm×50 mm. An aluminum current collector tab was connected to the positive electrode, and a nickel current collector tab was connected to the negative electrode. The positive electrode, the negative electrode, and a 27 μm-thick porous polyethylene separator were overlapped and wound around, and the wound electrode assembly was pressed into a flat shape.

This electrode assembly was inserted into a battery case made of a laminate film, and the above-described electrolyte solution was filled into the battery case in an Ar atmosphere glove box. Thus, a wound-type lithium secondary battery was fabricated.

Figure 3:
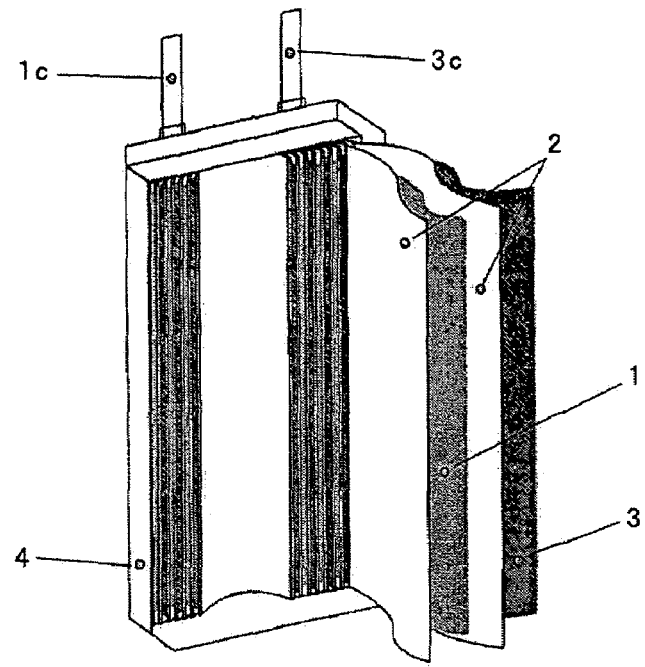
FIG. 3 is an exploded perspective view illustrating the battery structure of a wound-type lithium secondary battery fabricated according to an embodiment of the present invention.

The structure of the battery thus fabricated is illustrated in FIG. 3. FIG. 3 is an exploded perspective view of the fabricated wound-type battery. As shown in FIG. 3, a separator 2 is interposed between a positive electrode 1 and a negative electrode 3, and an additional separator 2 is inserted inward of the positive electrode 1. These electrodes and separators are wound around to form an electrode assembly, which is accommodated in a battery case 4. A negative electrode tab 3c is connected to the negative electrode 3, and a positive electrode tab 1c is connected to the positive electrode 1. The electrodes and separators are wound around 5 times.

Measurement of Negative Electrode Theoretical Capacity

The theoretical capacity of the above-described negative electrode was measured. A three-electrode cell was prepared using the same negative electrode as used in fabricating the just-described battery and metallic lithium for the counter electrode and the reference electrode. The electrolyte solution used was the same as that used in the just-described battery. The three-electrode cell was charged to a potential versus lithium of 0 V to find the charge capacity of the negative electrode. The theoretical capacity of the negative electrode was defined as the charge capacity thus obtained.

Initial Charging and Discharging

The above-described lithium secondary battery was charged with a constant current of 50 mA to 4.2 V, and thereafter was charged at a constant voltage to 13 mA. Thereafter, the battery was discharged at 50 mA to 2.75 V, and the initial charge-discharge efficiency (%), which is defined by the following equation, was found from the charge capacity and the discharge capacity at this time.

Initial charge-discharge efficiency (%)=Initial discharge capacity/Initial charge capacity The charge capacity of the positive electrode was determined as the initial charge capacity when the battery was charged and discharged under the above-described charge-discharge conditions, and from the charge capacity of the positive electrode and the above-described negative electrode theoretical capacity, the negative electrode/positive electrode capacity ratio defined by the following equation was obtained.

Negative electrode/positive electrode capacity ratio=Theoretical capacity of negative electrode/Charge capacity of positive electrode The positive electrode charge capacity, the negative electrode theoretical capacity, the negative electrode/positive electrode capacity ratio (capacity ratio), and the initial charge-discharge efficiency of the battery are shown in Table 2.

Charge-Discharge Test

The above-described lithium secondary battery was charged at 25° C. with a constant current of 250 mA to 4.2 V and thereafter charged with a constant voltage to 13 mA. Thereafter, the battery was discharged at 250 mA to 2.75 V, where the capacity retention ratio (%) at the 100th cycle, defined by the following equation, was found. The capacity retention ratio is shown in Table 2 below.

Capacity retention ratio (%)=(Discharge capacity at the 100th cycle)/(Discharge capacity at the first cycle)×100

Example 2

A positive electrode was prepared in the same manner as in Example 1, except that the weight of the positive electrode mixture applied was 135 mg/10 cm$^2$ per one side. A lithium secondary battery was fabricated in the same manner as in Example 1 except for the use of the resultant positive electrode. With the lithium secondary battery thus fabricated, the positive electrode charge capacity, the negative electrode theoretical capacity, the capacity ratio, the initial charge-discharge efficiency, and the capacity retention ratio were determined in the same manners as in Example 1. The results are shown in Table 2 below.

The charge-discharge current in the initial charging and discharging was 116 mA, the charge-discharge current in the charge-discharge test was 580 mA, and the end of charge current was 29 mA.

Comparative Example 1

A positive electrode was prepared in the same manner as in Example 1, except that the amount of the positive electrode mixture applied was 50 mg/10 cm$^2$ per one side. A lithium secondary battery was fabricated in the same manner as in Example 1 except for the use of the resultant positive electrode. With the lithium secondary battery thus fabricated, the positive electrode charge capacity, the negative electrode theoretical capacity, the capacity ratio, the initial charge-discharge efficiency, and the capacity retention ratio were determined in the same manners as in Example 1. The results are shown in Table 2 below.

The charge-discharge current in the initial charging and discharging was 40 mA, the charge-discharge current in the charge-discharge test was 200 mA, and the end of charge current was 10 mA.

Comparative Example 2

A positive electrode was prepared in the same manner as in Example 1, except that the weight of the positive electrode mixture applied was 176 mg/10 cm$^2$ per one side. A lithium secondary battery was fabricated in the same manner as in Example 1 except for the use of the resultant positive electrode. With the lithium secondary battery thus fabricated, the positive electrode charge capacity, the negative electrode theoretical capacity, the capacity ratio, the initial charge-discharge efficiency, and the capacity retention ratio were determined in the same manners as in Example 1. The results are shown in Table 2 below.

The charge-discharge current in the initial charging and discharging was 150 mA, the charge-discharge current in the charge-discharge test was 750 mA, and the end of charge current was 38 mA.

Comparative Example 3

A positive electrode was prepared in the same manner as in Example 1, except that the amount of the positive electrode mixture applied was 220 mg/10 cm$^2$ per one side. A lithium secondary battery was fabricated in the same manner as in Example 1 except for the use of the resultant positive electrode. With the lithium secondary battery thus fabricated, the positive electrode charge capacity, the negative electrode theoretical capacity, the capacity ratio, the initial charge-discharge efficiency, and the capacity retention ratio were determined in the same manners as in Example 1. The results are shown in Table 2 below.

The charge-discharge current in the initial charging and discharging was 180 mA, the charge-discharge current in the charge-discharge test was 900 mA, and the end of charge current was 45 mA.

Comparative Example 4

A negative electrode and a positive electrode only one side of each of which is provided with the active material were prepared in a similar manner to that in Example 1. The negative electrode was cut out into dimensions of 25 mm×25 mm and a nickel current collector tab was connected thereto, while the positive electrode was cut out into dimensions of 20 mm×20 mm and an aluminum current collector tab was connected thereto.

Figure 4:
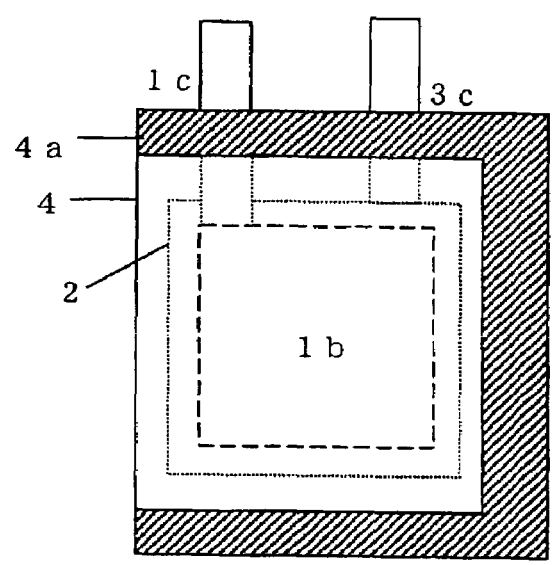
FIG. 4 is a plan view illustrating a flat-shaped lithium secondary battery that is a Comparative Example.
Figure 5:
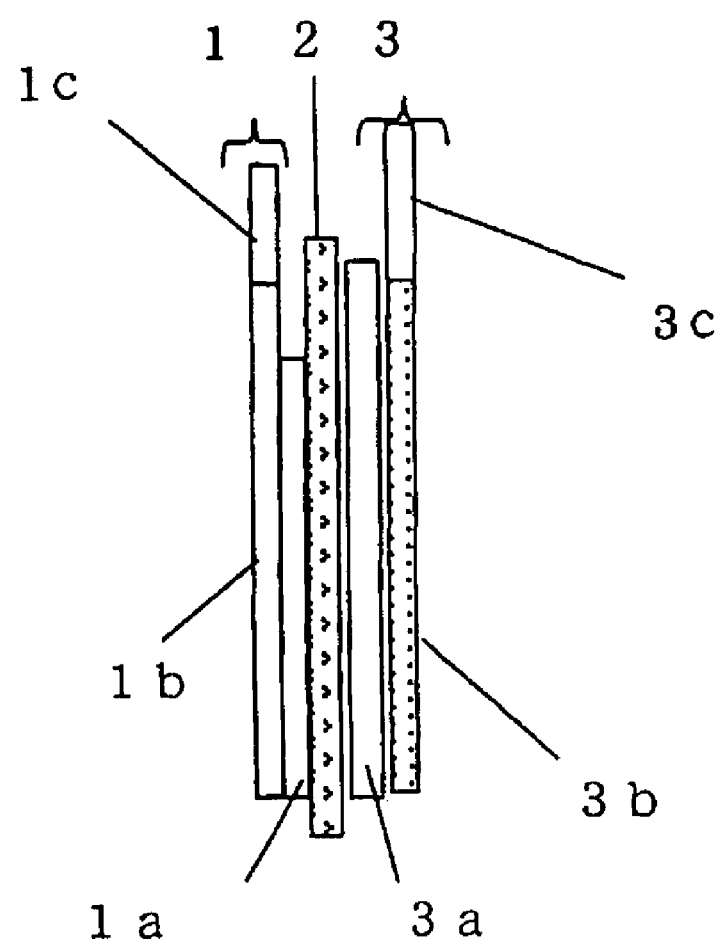
FIG. 5 is a cross-sectional view illustrating an electrode structure of the flat-shaped lithium secondary battery of the Comparative Example.

The just-noted positive electrode, negative electrode, and separator were overlapped with one another and inserted into a laminate case, and an electrolyte solution was filled therein. Thus, a flat-shaped lithium secondary battery was fabricated. FIG. 4 is a plan view of the fabricated flat-shaped lithium secondary battery, and FIG. 5 is a cross-sectional view illustrating the electrode structure inside the battery. As illustrated in FIGS. 4 and 5, in positive electrode 1, a positive electrode active material layer 1a is provided on a positive electrode current collector 1b, and in negative electrode 3, a negative electrode active material layer 3a is provided on a negative electrode current collector 3b. An aluminum positive electrode tab 1c is connected to the positive electrode current collector 1b, while a nickel negative electrode tab 3c is connected to the negative electrode current collector 3b. The positive electrode 1 and the negative electrode 3 are disposed so that their active material layers oppose across a separator 2, all of which are inserted in a battery case 4. The positive electrode tab 1c and the negative electrode tab 3c are taken out from the battery case 4. The battery case 4 is hermetically sealed by sealing a sealing part 4a, which is provided in the periphery portion of the battery case 4.

Initial Charging and Discharging

The above-described lithium secondary battery was charged with a constant current of 50 mA to 4.2 V, and thereafter was charged at a constant voltage to 13 mA. Thereafter, the battery was discharged at 50 mA to 2.75 V, and the initial charge-discharge efficiency (%) was found from the charge capacity and the discharge capacity at this time.

The initial charge-discharge efficiency of the just-described flat-shaped lithium secondary battery was obtained. The battery was charged with a constant current of 0.6 mA to 4.2 V and then charged with a constant voltage to 0.15 mA. Then, the battery was discharged at 0.6 mA to 2.75 V. From the measured positive electrode charge capacity, the capacity ratio was calculated, the result of which is shown in Table 2. The initial charge-discharge efficiency in the initial charge-discharge cycle is also shown in Table 2.

TABLE 2

| | Electrode structure | Positive electrode charge capacity (mAh/cm²) | Negative electrode theoretical capacity (mAh/cm²) | Capacity ratio | Initial charge-discharge efficiency (%) | Number of charge-discharge cycles | Capacity retention ratio (%) |
|---|---|---|---|---|---|---|---|
| Comp. Ex. 1 | Wound-type | 0.81 | 4.2 | 5.1 | 78.6 | 100 | 100 |
| Ex. 1 | Wound-type | 0.96 | 4.2 | 4.4 | 81.3 | 100 | 100 |
| Ex. 2 | Wound-type | 2.2 | 4.2 | 1.9 | 86.1 | 100 | 92 |
| Comp. Ex. 2 | Wound-type | 2.88 | 4.2 | 1.5 | 87.7 | 100 | 61 |
| Comp. EX. 3 | Wound-type | 3.6 | 4.2 | 1.2 | 92.4 | 100 | 4 |
| Comp. Ex. 4 | Flat-type | 0.96 | 4.2 | 4.4 | 60.2 | 100 | 88 |
| Comp. Ex. 5 | Flat-type | 2.2 | 4.2 | 1.9 | 71.6 | 100 | 95 |
| Comp. Ex. 6 | Flat-type | 3.6 | 4.2 | 1.2 | 78.8 | 100 | 87 |

Charge-Discharge Test

The capacity retention ratio of the just-noted flat-shaped lithium secondary battery was determined in the same manner as in Example 1. The battery was charged at 25° C. with a constant current of 3 mA to 4.2 V, and thereafter charged with a constant voltage to 0.15 mA. Then the battery was discharged at 3 mA to 2.75 V. The capacity retention ratio thus obtained is shown in Table 2 below.

Comparative Example 5

A positive electrode was prepared in the same manner as in Example 1, except that the weight of the positive electrode mixture applied was 135 mg/10 cm² per one side. A flat-shaped lithium secondary battery was fabricated in the same manner as in Comparative Example 4 except for the use of the resultant positive electrode. With the lithium secondary battery thus fabricated, the positive electrode charge capacity, the negative electrode theoretical capacity, the capacity ratio, the initial charge-discharge efficiency, and the capacity retention ratio were determined in the same manners as in Example 1. The results are shown in Table 2.

The charge-discharge current in the initial charging and discharging was 1.6 mA, the charge-discharge current in the charge-discharge test was 8 mA, and the end of charge current was 0.4 mA.

Comparative Example 6

A positive electrode was prepared in the same manner as in Example 1, except that the amount of the positive electrode mixture applied was 220 mg/10 cm² per one side. A flat-shaped lithium secondary battery was fabricated in the same manner as in Comparative Example 4 except for the use of the resultant positive electrode. With the lithium secondary battery thus fabricated, the positive electrode charge capacity, the negative electrode theoretical capacity, the capacity ratio, the initial charge-discharge efficiency, and the capacity retention ratio were determined in the same manners as in Example 1. The results are shown in Table 2 below.

The charge-discharge current in the initial charging and discharging was 2.6 mA, the charge-discharge current in the charge-discharge test was 13 mA, and the end of charge current was 0.65 mA.

Figure 2:
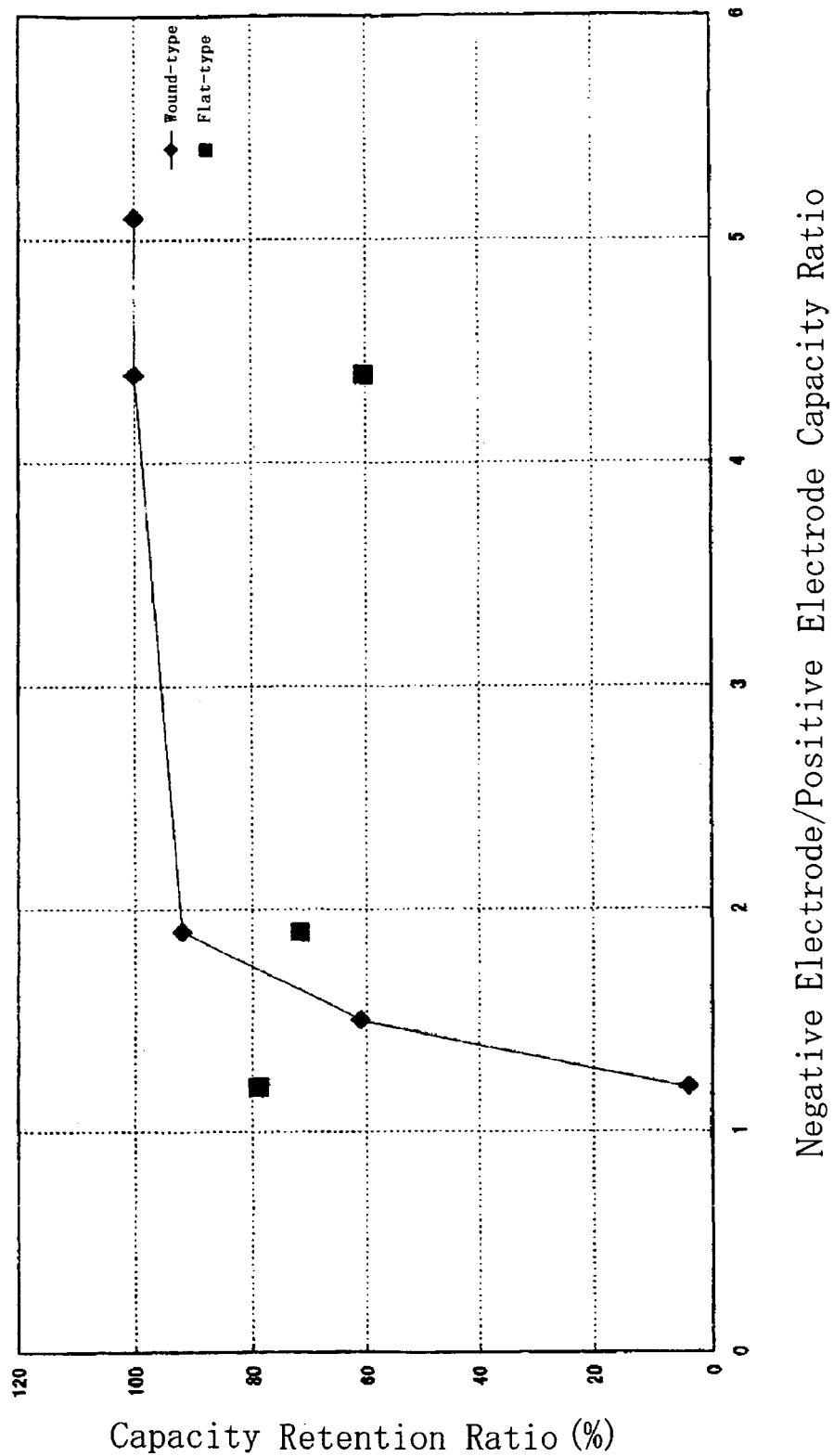
FIG. 2 is a graph illustrating a relationship between negative electrode/positive electrode capacity ratio (negative electrode capacity/positive electrode capacity) and capacity retention ratio.

FIG. 1 illustrates a relationship between the negative electrode/positive electrode capacity ratios and the initial charge-discharge efficiencies, which are tabulated in Table 2. FIG. 2 illustrates a relationship between the negative electrode/positive electrode capacity ratios and the capacity retention ratios.

From Table 2 and FIG. 2, it will be appreciated clearly that Examples 1 and 2, in which the negative electrode/positive electrode capacity ratio (negative electrode capacity/positive electrode capacity) is within the range of from 1.9 to 4.4 in accordance with the invention, exhibited high capacity retention ratios. Although Comparative Example 1 attained a high capacity retention ratio, showing a negative electrode/positive electrode capacity ratio of higher than 4.4, its initial charge-discharge efficiency is low, as seen from FIG. 1 and Table 2. Accordingly, it is appreciated that setting the negative electrode/positive electrode capacity ratio within the range of from 1.9 to 4.4 in accordance with the present invention enables a lithium secondary battery to have high initial charge-discharge efficiency, in other words, high charge-discharge capacity, and good charge-discharge cycle performance.

In addition, comparisons with Comparative Examples 4 to 6 reveal that flat-shaped lithium secondary batteries do not show the advantageous effect of the present invention in which a battery is enabled to have high charge-discharge capacity and good charge-discharge cycle performance by setting the negative electrode/positive electrode capacity ratio to be within the range of from 1.9 to 4.4 in accordance with the present invention.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2004-380102 filed Dec. 28, 2004, which is incorporated herein by reference.

What is claimed is:

1. A lithium secondary battery comprising:
    a negative electrode having a current collector and a thin film made of silicon or a silicon alloy as a negative electrode active material, the thin film being provided on the current collector and divided into columnar structures by gaps that are formed along its thickness, and the bottom portions of the columnar structures being in close contact with the current collector;
    a positive electrode;
    a separator;
    the positive and negative electrodes being overlapped with the separator interposed therebetween, and the positive and negative electrodes and the separator being wound around to form an electrode assembly;
    a non-aqueous electrolyte; and
    a battery case accommodating the electrode assembly; wherein
    the ratio of theoretical capacity per unit area of the negative electrode to charge capacity per unit area of the positive electrode (negative electrode capacity/positive electrode capacity) is within the range of from 1.9 to 4.4.

2. The lithium secondary battery according to claim 1, wherein the negative electrode active material is a silicon-cobalt alloy.

3. The lithium secondary battery according to claim 1, wherein the current collector surface has an arithmetical mean roughness Ra of 0.1 μm to 1 μm.

4. The lithium secondary battery according to claim 1, wherein the current collector is formed of a conductive metal foil made of copper or copper alloy.

5. The lithium secondary battery according to claim 1, wherein carbon dioxide is dissolved into the nonaqueous electrolyte.

* * * * *